(12) United States Patent
Pichler et al.

(10) Patent No.: US 11,321,600 B1
(45) Date of Patent: May 3, 2022

(54) RFID TAG SELF TUNING

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/303,488

(22) Filed: May 29, 2021

(51) Int. Cl.
*G06K 19/07* (2006.01)
*G06K 19/077* (2006.01)

(52) U.S. Cl.
CPC ... *G06K 19/0715* (2013.01); *G06K 19/07773* (2013.01)

(58) Field of Classification Search
CPC ........... G06K 19/0723; G06K 19/0726; G06K 19/07773; G06K 19/0707; G06K 7/10366; G06K 7/10128; G06K 19/0712; G06K 19/0709; G06K 7/10009; G06K 7/10316; G06K 19/0715; G06K 7/10356; G06K 19/07336; G06K 7/086; G06K 17/0022; G06K 7/10039; G06K 19/0705; G06K 7/10198; G06K 7/10059; G06K 7/10158; G06K 7/10336; G06K 19/0701; G06K 19/07749
See application file for complete search history.

(56) References Cited

U.S. PATENT DOCUMENTS

| | | | |
|---|---|---|---|
| 7,158,009 B2 | 1/2007 | Watanabe | |
| 7,259,612 B2 | 8/2007 | Saether | |
| 7,439,860 B2 | 10/2008 | Andresky | |
| 7,688,122 B2 | 3/2010 | Nedovic | |
| 7,944,279 B1 | 5/2011 | El Waffaoui | |
| 8,500,033 B2 | 8/2013 | Almond et al. | |
| 8,687,395 B2 | 4/2014 | El Waffaoui | |
| 9,030,297 B2 | 5/2015 | Hill | |
| 9,471,816 B1* | 10/2016 | Hyde | G06K 19/07773 |
| 9,594,997 B1 | 3/2017 | Buescher | |
| 9,997,928 B2 | 6/2018 | Petersen et al. | |
| 10,587,110 B2 | 3/2020 | Malinowski | |

(Continued)

FOREIGN PATENT DOCUMENTS

| | | |
|---|---|---|
| CN | 104052415 A | 9/2014 |
| EP | 2487993 A2 | 8/2012 |

OTHER PUBLICATIONS

U.S. Appl. No. 17/247,650, filed Dec. 18, 2020, entitled: Dual System RFID Tag. The Examiner is referred to the copending patent prosecution of the common Applicant (no attachment).

(Continued)

*Primary Examiner* — Thien T Mai

(57) ABSTRACT

A Radio Frequency Identification (RFID) tag is disclosed. The RFID tag includes an antenna port to receive an input AC signal and a self-tuning circuit coupled with the antenna port to optimize signal strength of the input AC signal during a self-tuning phase. The RFID tag further includes an AC limiter configured to limit the voltage of the input AC signal to a preconfigured limit and a limiter controller configured to disable the AC limiter during the self-tuning phase and re-enable the AC limiter after the self-tuning phase. The self-tuning phase occurs prior to the data communication period in which the data stored in the RFID tag is transmitted back to a reader.

16 Claims, 2 Drawing Sheets

(56) References Cited

U.S. PATENT DOCUMENTS

| | | | |
|---|---|---|---|
| 2004/0212503 A1* | 10/2004 | Stilp | G08B 13/248 340/572.1 |
| 2007/0257800 A1* | 11/2007 | Yang | G06K 19/073 343/841 |
| 2010/0019907 A1 | 1/2010 | Shanks | |
| 2011/0115540 A1 | 5/2011 | Kamp | |
| 2015/0129666 A1* | 5/2015 | Butler | G06K 19/073 235/492 |
| 2015/0227832 A1* | 8/2015 | Diorio | G06K 19/07756 29/601 |
| 2016/0180123 A1* | 6/2016 | Forster | G06K 19/0726 340/10.51 |
| 2017/0104408 A1 | 4/2017 | Rebollo et al. | |

OTHER PUBLICATIONS

U.S. Appl. No. 17/303,485, filed May 29, 2021, entitled: Self Limiting Charge Pump. The Examiner is referred to the copending patent prosecution of the common Applicant (no attachment).

U.S. Appl. No. 17/303,487, filed May 29, 2021, entitled: RFID Tag Limiter. The Examiner is referred to the copending patent prosecution of the common Applicant (no attachment).

Non-Final Office Action for U.S. Appl. No. 17/303,487; dated Dec. 30, 2021; 14 Pages.

Non-Final Office Action dated Feb. 17, 2022 for U.S. Appl. No. 17/303,485, 15 Pages.

* cited by examiner

RFID TAG SELF TUNING

BACKGROUND

Radio Frequency Identification (RFID) refers to a wireless system comprised of two components: tags and readers. The reader is a device that has one or more antennas that emit radio waves and receive signals back from the RFID tag. Tags, which use radio waves to communicate their identity and other information to nearby readers, can be passive or active. Passive RFID tags are powered by the reader and do not have a battery. Active RFID tags are powered by batteries. Near Field Communication (NFC) is a wireless communication technology that acts over short distances for two-way communication. The use of NFC tags is growing in several markets, including the medical, consumer, retail, industrial, automotive, and smart grid markets. NFC is a type of RFID technology. Due to internal or external factors such as distance from the other device or tag, nearby objects, etc. the tag needs to be tuned to balance the impedance to optimize the received signal strength before a data read cycle starts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a Radio Frequency Identification (RFID) tag is disclosed. The RFID tag includes an antenna port to receive an input AC signal and a self-tuning circuit coupled with the antenna port to optimize signal strength of the input AC signal during a self-tuning phase. The RFID tag further includes a limiter configured to limit the voltage of the input AC signal to a preconfigured limit and a limiter controller configured to deactivate the limiter during the self-tuning phase and re-enable the limiter after the self tuning phase. The self-tuning phase occurs prior to the data communication phase.

In some embodiments, the self-tuning phase includes a preconfigured number of stages. The limiter controller is configured to deactivate the limiter only during a preconfigured stage in the preconfigured number of stages. The self-tuning circuit is configured to change an input impedance of the antenna coupled with the antenna input port. The limiter may include a current measuring circuit configured to measure a current being sunk by the limiter and is configured to measure if the signal strength is increasing or decreasing based on the measure. A DC limiter may be included in some examples to limit a DC output of the input AC signal, after the input AC signal is rectified by a rectifier circuit. The limiter controller is configured to disable the AC limiter during the self-tuning phase. A communication phase includes the self-tuning phase and a data return phase in which a data is returned back to a receiver (e.g., the RFID reader). The RFID tag described herein may be incorporated in an integrated circuit. In some examples, the AC limiter includes a pair of transistors wherein gates of the pair of transistors are coupled together and the limiter controller is configured to disable the AC limiter by setting analog gate voltage applied to the gates of the pair of transistors to a value that is different from gate voltage that is applied to the gates after the self tuning phase.

In another embodiment, a method of tuning a Radio Frequency Identification (RFID) tag is disclosed. The method includes self-tuning to optimize signal strength of an input AC signal during a self-tuning phase and disabling a limiter configured to limit an output voltage to a preconfigured limit during the self-tuning phase. The self-tuning phase is a subpart of the communication phase and occurs prior to the data return phase.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
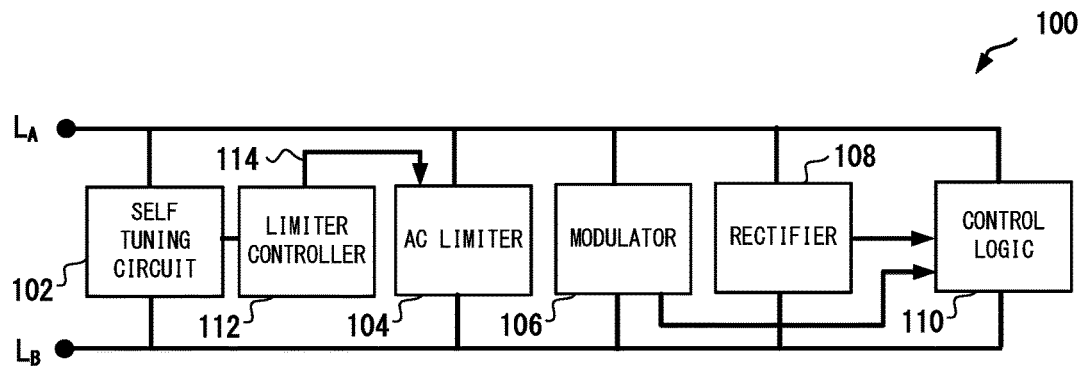
FIGS. 1 and 2 depict RFID tags in accordance with one or more embodiments of the present disclosure.

Note that figures are not drawn to scale. Not all components of the RFID tag are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

RFID tags can store a range of information from one serial number to several pages of data. RFID tags can be mobile so that they can be carried by hand, or they can be mounted on a post or overhead. RFID systems can also be built into the architecture of a cabinet, room, or building. NFC is a technology based on RFID technology. NFC technology can be used to provide peer-to-peer communication or one way communication. When two NFC enabled devices are very close to each other, about 4 cm or less, they can communicate with each other using the radio waves. Of the two devices communicating using NFC, at least of them has to be an active device (powered). In many cases, this would be a smartphone, tablet, security pad, or a payment terminal. The other device can be either active or passive (unpowered). Using NFC, two devices can be set up in less than one-tenth of a second.

In an active peer-to-peer (P2P) mode, two active devices create a wireless communication channel between them. The active device, with an external power supply, can power the passive device with the electromagnetic field coming from the active device. U.S. Pat. No. 9,997,928 entitled "self-tuning resonant power transfer systems" by Petersen describes tuning a wireless power transfer system, which is incorporated herein by reference. U.S. Pat. No. 8,836,512 entitled "Self tuning RFID" by Shanks describes the self-tuning of RFID tag, which is incorporated herein by reference. The self-tuning of the RFID tag ensures optimal power transfer from the active device to the RFID tag so that the RFID tag can use the received energy to transfer data back to the active device. NFC passive devices are used in many applications because the passive NFC device can be a simple tag. NFC devices communicate with each other via radio waves. The active NFC device has to be enabled (turned on) first. The radio waves for NFC are generated using an antenna. NFC works by exploiting the properties of electromagnetic fields, using the inductive coupling between NFC devices. It operates at the 13.56 MHz frequency, which is a license-free section of HF on the RF spectrum.

The strength of the received signal may be dependent on the distance as well as external factors such as nearby objects, human touch, etc. Therefore, in some examples, RFID tags may include a switchable capacitor bank that includes a plurality of capacitors coupled with switches. The value of the capacitor may be changed by turning one or more of these switches on or off. The input impedance of the receiver antenna may be changed by changing the capacitor value to optimize the signal strength of the input signal.

Figure 3:
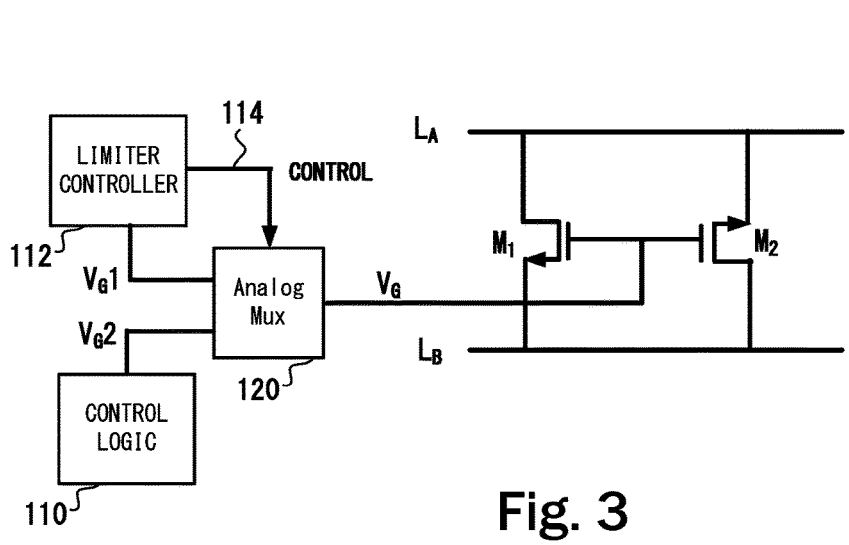
FIG. 3 depicts an example limiter circuit used in the RFID tag in accordance with one or more embodiments of the present disclosure.

FIG. 1 shows a schematic of an embodiment of an RFID tag 100 that includes an antenna port including pins to receive $L_A$ and $L_B$ inputs from an antenna. In some examples, the antenna port may be configured to receive signals via a wire coil type antenna. The RFID tag 100, which may be incorporated in an integrated circuit (IC) and may include a self-tuning circuit 102, an AC limiter 104, a modulator 106 and a control logic 110. The modulator 106 may be configured to encode the RFID tag interrogation request in a signal form and modulating the signal and transfer the signal to the control logic 110. The control logic 110 may include data that the control logic 110 may transmit back in the response to the interrogation request. A rectifier 108 may be included to convert the signal between $L_A$ and $L_B$ into a DC signal which may be inputted to the control logic 110. An AC limiter 104 is included to provide electrostatic discharge (ESD) protection and to limit the signal voltage to a preconfigured value to protect the downstream circuit in the RFID tag 100. A limiter circuit used in RFID tags is well known in the art. FIG. 3 shows one example of a limiter circuit 104. Other implementations of the limiter circuit for RFID tags may be used. The AC limiter 104 includes a control port or input to enable or disable the AC limiter 104. The AC limiter 104 in FIG. 3 includes transistors M1, M2 that are driven by a voltage signal $V_G$.

A limiter controller 112 is included that is coupled with the AC limiter 104 through a control line 114. The limiter controller 112 is configured to send enable or disable signals to the AC limiter 104. In response to the control signals, the AC limiter 104 is enabled or disabled. Disabling the AC limiter 104 may mean disconnecting the AC limiter 104 from the rest of the circuit or making the AC limiter 104 inoperable through a disable control signal. In some embodiments, the limiter controller 112 may be a part of the self-tuning circuit 102. It should be noted that the RFID tag 100 may include other well-known modules or the shown modules may be coupled differently in other examples. The embodiments described herein may apply to any RFID tag circuit configuration so long as the configuration includes a self-tuning and a limiter circuit (e.g., the AC limiter 104). When the RFID tag 100 is brought close to a RFID tag reader (not shown), the received electromagnetic energy energizes the self-tuning circuit 102 and the self-tuning circuit 102 starts to change an internal impedance of the RFID tag 100 (e.g., via changing the capacitance of a capacitor bank (not shown)) to achieve an optimum voltage of the input signal received at $L_A$ and $L_B$. The self-tuning may be performed for a preconfigured period of time or until a preconfigured output voltage is achieved. During the self-tuning period, the limiter controller 112 may operate to freeze the AC limiter 104 via the control line 114. Upon completion of the self-tuning, the limiter controller 112 may enable the AC limiter 104 again and the AC limiter 104 may stay operational at least until the completion of the data transfer from the RFID tag 100, 120 to the RFID reader (not shown).

To optimize the power transfer from the RFID reader to the RFID tag 100, the impedance of the RFID tag 100 needs to be optimally tuned. However, the AC limiter 104 inhibits an optimal tuning by limiting the output voltage thus preventing an optimal power transfer. The limiter controller 112 is configured to freeze the operations of the AC limiter 104 (for example, by keeping $V_G$ at a same level) during the self-tuning phase so that the impedance can be tuned optimally to provide optimal data transfer back to the RFID reader after the self-tuning phase.

Figure 2:
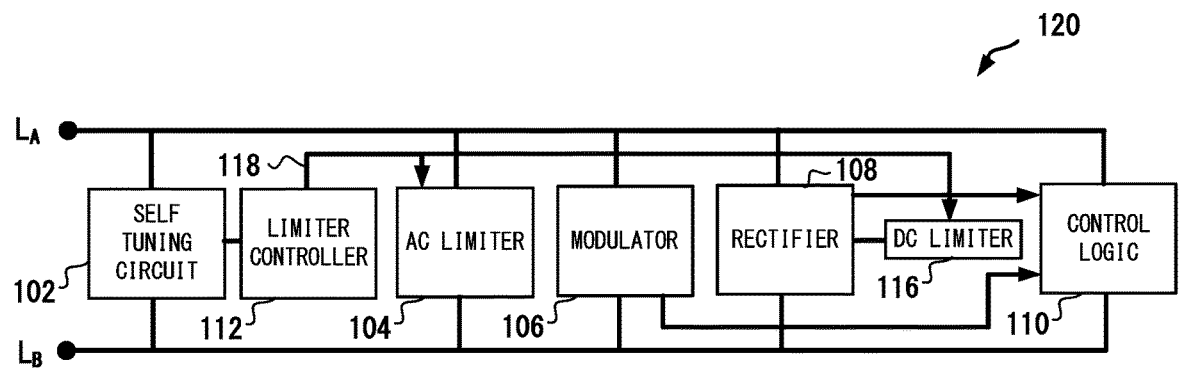

FIG. 2 is an RFID tag 120 that is configured similar to the RFID tag 100 and also operates similarly to the RFID tag 100. The RFID tag 120 may include a DC limiter 116 to limit the output voltage of the rectifier 108. In some embodiments, the AC limiter 104 may be omitted when the DC limiter 116 is included. The DC limiter 116 may provide a stable ground support through a ground switch. An example of a ground switch is described by "IMPROVED GROUND SWITCH", U.S. application Ser. No. 17/247,997 filed on Jan. 4, 2021, which is incorporated herein by reference. The AC limiter 104 generally operates between $L_A$ and $L_B$, thus the ground may not be stable. In some applications where the RFID tag 120 provides a tamper protection by detecting ground, a stable ground is important. The AC limiter 104 and the DC limiter 116 may be enabled or disabled by the limiter controller 112 via the control line 118 that couples the limiter controller 112 with the AC limiter 104 and the DC limiter 116.

FIG. 3 shows the details of the AC limiter 104 in one example. Other implementations are possible so long those implementations provide a control to deactivate the limiting function of the AC limiter 104 during at least a part of the self tuning phase. The AC limiter 104 includes transistors $M_1$ and $M_2$, preferably of NMOS type coupled between the $L_A$ and $L_B$ lines or $L_A/L_B$ input ports. The limiting effect of the AC limiter 104 is controlled by changing the gate drive voltage $V_G$ that drives the gates of the transistors M1 and M2. $V_G$ is a continuous analog voltage instead of an ON/OFF switching signal and the value of $V_G$ control the output of the AC limiter 104. In some embodiments, the gate voltage $V_G$ is selected from $V_G1$ and $V_G2$ voltage inputs through an analog multiplexer 120. The gate voltage $V_G1$ may be provided by the limiter controller 112 when the control signal is set to disable the AC limiter 104. The control logic 110 may provide the gate voltage $V_G2$. In some examples, the gate voltage $V_G2$ may be varied by the control logic 110 to change the output voltage of the AC limiter 104. The voltages $V_G1$ and $V_G2$ are derived from the input AC signal at $L_A/L_B$. In some examples, if the transistors M1 and M2 are NMOS transistors, to disable the AC limiter 104 (i.e., or to increase output of the AC limiter 104, thus removing the limiter effect), the gate voltage $V_G1$ may be lowered. The limiter controller 112 may determine the value of $V_G1$ such that the self-tuning circuit 102 may achieve the optimum voltage at $L_A/L_B$. The limiter controller 112 may also be configured to apply the gate voltage $V_G1$ (by enabling the control signal) only during one or more self-tuning phases. After the self-tuning phase, the control signal causes the analog multiplexer 120 to select the gate voltage $V_G2$ which may be higher than $V_G1$ (in NMOS example) and the value of $V_G2$ may be set by the control logic 110.

Figure 4:
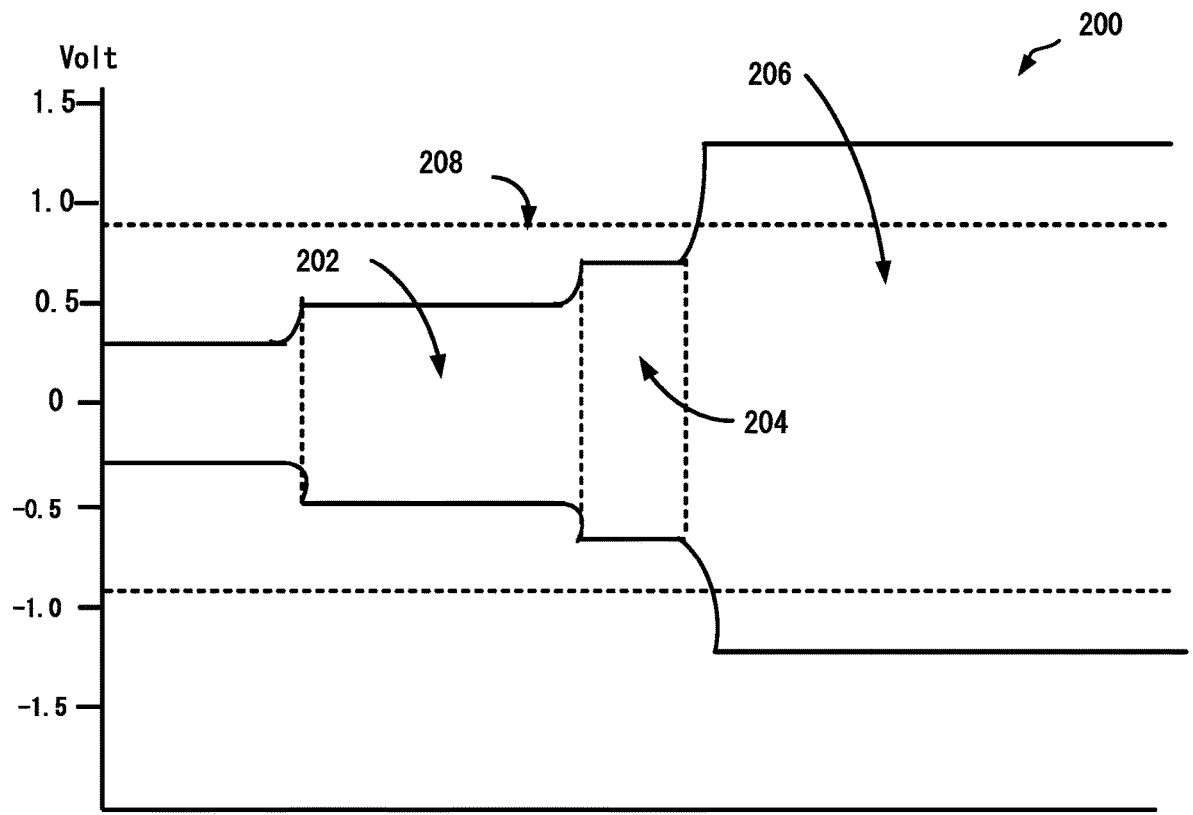
FIG. 4 shows an output voltage graph during the self-tuning of the RFID tag in accordance with one or more embodiments of the present disclosure.

FIG. 4 shows output voltage graphs 200 during the self-tuning cycle. The self-tuning takes place in a preconfigured number of steps. In one example, there may be three tuning steps. In the first tuning step 202, the self-tuning circuit 102 changes the impedance of the RFID tag and detects the output level. The second tuning step 204 depicts the output voltage after the self-tuning circuit 102 further changes the impedance and the third tuning step 206 shows the output voltage when the self-tuning circuit 102 further changes the impedance. The voltage level 208 shows the cut-off voltage of the AC limiter 104. If the AC limiter 104 remains active during the self-tuning phase or steps, at least in the third tuning step 206, the output voltage will be limited to the voltage level 208, thus limiting the optimal tuning of the impedance. However, if the AC limiter 104 (and the limiter 116 in some examples) is disabled during the self-tuning steps, an optimal tuning can be achieved.

Figure 5:
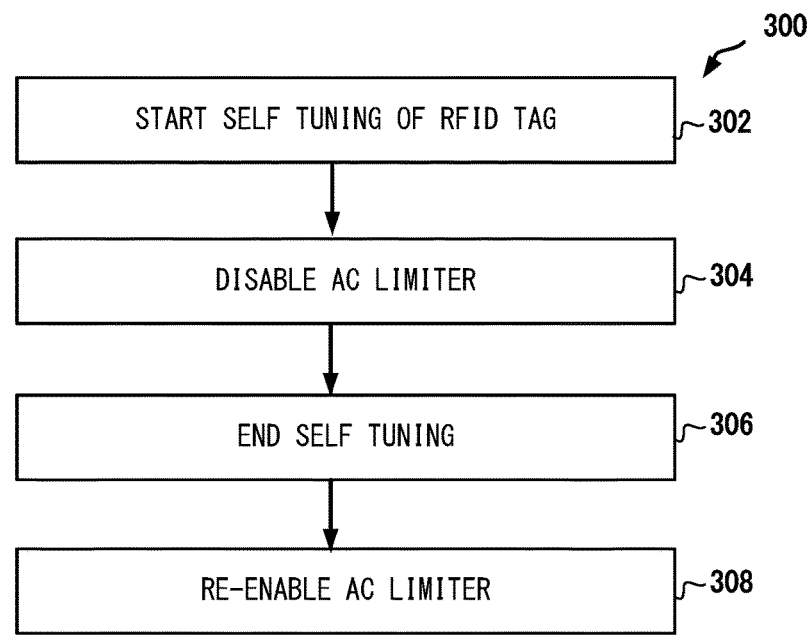
FIG. 5 shows a method of disabling the limiter during the self-tuning of the RFID tag in accordance with one or more embodiments.

FIG. 5 depicts a flow diagram for the method 300 to optimize self-tuning of the RFID tag 100, 120. Accordingly, at step 302, when the RFID tag 100, 120 is brought near a RFID reader, the electromagnetic emission from the RFID reader energizes the self-tuning circuit 102 and the self-tuning circuit 102 enters into a self-tuning phase. At step 304, the limiter controller 112 disables the AC limiter 104 (and the DC limiter 116 if present) by providing a gate voltage $V_G1$ that causes the transistors $M_1$ and $M_2$ to raise the AC limiter 104 output, thus disabling the limited effect of the AC limiter 104. At step 306, the self-tuning process ends after achieving an optimal signal voltage by changing the impedance of the RFID tag 100, 120 to an optimal value. At step 308, the AC limiter 104 (and the DC limiter 116 if present) is re-enabled by selecting the gate voltage $V_G2$ through the analog multiplexer 120. The RFID tag 100, 120 may not include their own local power source, hence without the optimal tuning, the RFID tag 100, 120 may not be able to transmit the interrogated data back to the RFID reader if the impedance is not well tuned because without a sufficient input signal strength, the RFID tag 100, 120 may not have sufficient energy to transmit the data back to the RFID reader.

In some embodiments, the limit controller 112 may be configured to deactivate the AC limiter 104 (and also the DC limiter 116, if present) only during less than all steps of the self-tuning phase. For example, referring to FIG. 4, the limiter controller 112 may be configured to deactivate the AC limiter 104 (and in some examples, also the DC limiter 116, if present) only during the third step of self-tuning phase 206. For example, in some embodiments the limiter controller 112 may be configured to deactivate the AC limiter 104 (and also the DC limiter 116, if present) during the self-tuning stage when the cut-off threshold voltage of the AC limiter 104 is lower than the expected optimal voltage, in some examples, based on the testing of the RFID tag 100, 120.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A Radio Frequency Identification (RFID) tag, comprising:
    an antenna port to receive an input AC signal;
    a self-tuning circuit coupled with the antenna port to optimize signal strength of the input AC signal during a self-tuning phase;
    an AC limiter configured to limit voltage of the input AC signal to a preconfigured limit; and
    a limiter controller configured to disable the AC limiter during the self-tuning phase, wherein the self-tuning phase occurs prior to a data communication phase, and to re-enable the AC limiter after the self-tuning phase.

2. The RFID tag of claim 1, wherein the self-tuning phase includes a preconfigured number of stages.

3. The RFID tag of claim 2, wherein the limiter controller is configured to deactivate the AC limiter only during a preselected stage in the preconfigured number of stages.

4. The RFID tag of claim 1, wherein the self-tuning circuit is configured to change an input impedance of the antenna coupled with the antenna input port.

5. The RFID tag of claim 2, wherein the AC limiter includes a current measuring circuit configured to measure a current being sunk by the AC limiter and is configured to measure if the signal strength is increasing or decreasing based on the measure.

6. The RFID tag of claim 1, further including a DC limiter to limit a DC output of the input AC signal after the input AC signal is rectified by a rectifier.

7. The RFID tag of claim 6, wherein the limiter controller is configured to deactivate the DC limiter during the self-tuning phase.

8. The RFID tag of claim 1, wherein the data communication period includes the self-tuning phase and a data return phase in which a data is returned back to a receiver.

9. The RFID tag of claim 1, wherein the AC limiter includes a pair of transistors wherein gates of the pair of transistors are coupled together.

10. The RFID tag of claim 9, wherein the limiter controller is configured to disable the AC limiter by setting gate voltage applied to the gates of the pair of transistors to a value that is different from gate voltage that is applied to the gates after the self tuning phase.

11. The RFID tag of claim 9, wherein the pair of transistors are of type NMOS and a gate voltage applied during the self-tuning phase is lower than the gate voltage applied after the self-tuning phase.

12. An integrated circuit, comprising the RFID tag of claim 1.

13. A method of tuning a Radio Frequency Identification (RFID) tag, the method comprising:
    self-tuning to optimize signal strength of an input AC signal during a self-tuning phase; and
    disabling a limiter configured to limit an output voltage to a preconfigured limit during the self-tuning phase and re-enabling the limiter after the self-tuning phase, wherein the self-tuning phase occurs prior to a data communication phase.

14. The RFID tag of claim 13, wherein the self-tuning phase includes a preconfigured number of stages.

15. The RFID tag of claim 14, wherein the deactivating the limiter includes deactivating the limiter only during a preconfigured stage in the preconfigured number of stages.

16. The RFID tag of claim 13, wherein the deactivating includes limiting the output voltage of a DC part of the output of the limiter.

* * * * *